United States Patent
Godbout

(10) Patent No.: US 12,253,103 B2
(45) Date of Patent: Mar. 18, 2025

(54) FASTENER WITH PIVOTING HEAD

(71) Applicant: Joseph Daniel Paul Godbout, Vernon (CA)

(72) Inventor: Joseph Daniel Paul Godbout, Vernon (CA)

(*) Notice: Subject to any disclaimer, the term of this patent is extended or adjusted under 35 U.S.C. 154(b) by 500 days.

(21) Appl. No.: 16/067,101

(22) PCT Filed: Dec. 28, 2016

(86) PCT No.: PCT/CA2016/051546
§ 371 (c)(1),
(2) Date: Jun. 28, 2018

(87) PCT Pub. No.: WO2017/113015
PCT Pub. Date: Jul. 6, 2017

(65) Prior Publication Data
US 2019/0003515 A1    Jan. 3, 2019

Related U.S. Application Data

(60) Provisional application No. 62/272,601, filed on Dec. 29, 2015.

(51) Int. Cl.
*F16B 35/06* (2006.01)
*F16C 11/04* (2006.01)
*F16B 23/00* (2006.01)

(52) U.S. Cl.
CPC .............. *F16B 35/06* (2013.01); *F16C 11/04* (2013.01); *F16B 23/0015* (2013.01)

(58) Field of Classification Search
CPC ...... F16B 23/00; F16B 23/0015; F16B 35/06; F16B 35/00; F16C 11/04; Y10S 411/91
USPC .......................................... 411/396, 402–403
See application file for complete search history.

(56) References Cited

U.S. PATENT DOCUMENTS

| | | | |
|---|---|---|---|
| 3,054,321 A | | 8/1962 | Macchia |
| 4,038,801 A | | 8/1977 | Busch |
| 4,430,035 A | | 2/1984 | Rodseth |
| 5,606,898 A | | 3/1997 | Franciskovich et al. |
| 5,672,176 A | * | 9/1997 | Biedermann ...... A61B 17/7037 606/271 |
| 5,833,418 A | * | 11/1998 | Shoji ................... E06B 3/5436 411/396 |
| 5,833,419 A | * | 11/1998 | Franciskovich ........ B25B 13/02 411/403 |

(Continued)

OTHER PUBLICATIONS

International Searching Authority, The International Search Report and the Written Opinion of the International Searching Authority, or the Declaration, International Application No. PCT/CA2016/051546, Filed Dec. 28, 2016, 7 pages, Receiving Office—Canadian Intellectual Property Office.

*Primary Examiner* — Roberta S Delisle

(57) ABSTRACT

A fastener comprises a threaded shank extending along an axis between top and bottom ends and a semi spherical body affixed at the top end of the threaded shank. The fastener further comprises a head having a receptacle adapted to closely surround the semi-spherical body, the head being pivotable about the semi spherical body and rotatably fixed relative to the semi spherical body about the axis of the threaded shank and a drive disposed on the head adapted to receive a tool for rotating the head and the threaded shank about the axis of the threaded shank.

12 Claims, 5 Drawing Sheets

(56) References Cited

U.S. PATENT DOCUMENTS

| | | | | |
|---|---|---|---|---|
| 6,273,888 B1* | 8/2001 | Justis | ................ | A61B 17/7032 |
| | | | | 606/272 |
| 6,302,888 B1* | 10/2001 | Mellinger | .......... | A61B 17/7032 |
| | | | | 411/393 |
| 6,641,586 B2* | 11/2003 | Varieur | .............. | A61B 17/7032 |
| | | | | 411/403 |
| 6,692,176 B1* | 2/2004 | Fladhammer | ............ | B60Q 1/06 |
| | | | | 403/122 |
| 7,819,902 B2 | 10/2010 | Abdelgany et al. | | |
| 7,850,410 B1 | 12/2010 | Curtis | | |
| 7,942,909 B2* | 5/2011 | Hammill, Sr. | ..... | A61B 17/7037 |
| | | | | 606/267 |
| 8,075,603 B2* | 12/2011 | Hammill, Sr. | ..... | A61B 17/7037 |
| | | | | 606/267 |
| 8,444,681 B2* | 5/2013 | Jackson | ............. | A61B 17/7032 |
| | | | | 606/300 |
| 8,529,609 B2 | 9/2013 | Helgerson et al. | | |
| 8,808,335 B2 | 8/2014 | Biedermann | | |
| 2003/0100896 A1* | 5/2003 | Biedermann | ........... | F16B 43/02 |
| | | | | 606/305 |

* cited by examiner

FASTENER WITH PIVOTING HEAD

BACKGROUND OF THE INVENTION

1. Field of Invention

The present invention relates generally to fasteners and in particular to a fastener with a pivoting head.

2. Description of Related Art

Fasteners are utilized in a wide variety of environments for securing one object to another. Commonly, fasteners, such as screws include a threaded shank portion and a head portion. The head portion includes a socket or the like shaped to receive a corresponding head of a screw driver therein so as to impart a torque to the shank portion thereby driving the screw into the an object.

One disadvantage of fasteners is that in order to impart a designed amount of torque to the head of the screw, the head of the screwdriver is required to fit closely within the screwdriver socket. Such alignment commonly requires therefore that the head and screw driver be aligned and remain aligned while the screw is driven into the body. It will be appreciated that such alignment between the fastener head and the screw driver may not be practical or possible in all circumstances. In particular, where the screw is to be located adjacent to a wall perpendicular to the body into which the screw is to be inserted, such wall will interfere with proper driving of the screw into the body.

Additionally, when conventional fasteners are driven into a surface on an angle, the head of the fastener will similarly be oriented at an angle relative to the surface. This may be particularly problematic where the fastener is passed through a hard layer at the surface of the object, such as, by way of non-limiting example, when passed through a hinge bracket. It will be appreciated that fastener heads through such hinge brackets which do not sit flush may interfere with the operation of the hinge.

SUMMARY OF THE INVENTION

According to a first embodiment of the present invention there is disclosed a fastener comprising a threaded shank extending along an axis between top and bottom ends and a semi spherical body affixed at the top end of the threaded shank. The fastener further comprises a head having a receptacle adapted to closely surround the semi-spherical body, the head being pivotable about the semi spherical body and rotatably fixed relative to the semi spherical body about the axis of the threaded shank and a drive disposed on the head adapted to receive a tool for rotating the head and the threaded shank about the axis of the threaded shank.

The semi spherical body may be substantially hollow. The drive may comprise a drive socket for receiving a screw driver therein. The drive socket may be nested within the semi spherical body. The drive may comprise a bolt head disposed around a periphery of the head.

The semi-spherical body may includes longitudinal slots extending therealong parallel to the axis of the threaded shank. The receptacle may include pins extending radially inwardly therefrom at positions corresponding to the longitudinal slots of the semi-spherical body.

The head may have a substantially hollow interior therein. The receptacle may be formed by at least two semi-spherical plates rotationally fixed within the head. The head may include plates extending radially into the hollow interior thereof between the semi-spherical plates so as to rotationally fix the semi-spherical plates therein.

The fastener may further comprise a set screw extending from said receptacle so as to be adapted to be extended into engagement with the semi-spherical body so as to pivotally lock the head to the semi spherical body. The set screw may extend to the drive socket.

The fastener may further comprise a portion of a selectably hardenable epoxy between the receptacle and the semi spherical body. The portion of selectably hardenable epoxy may be contained within at least one containment body. The at least one containment body may frangible. The at least one containment body may be dissolvable.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
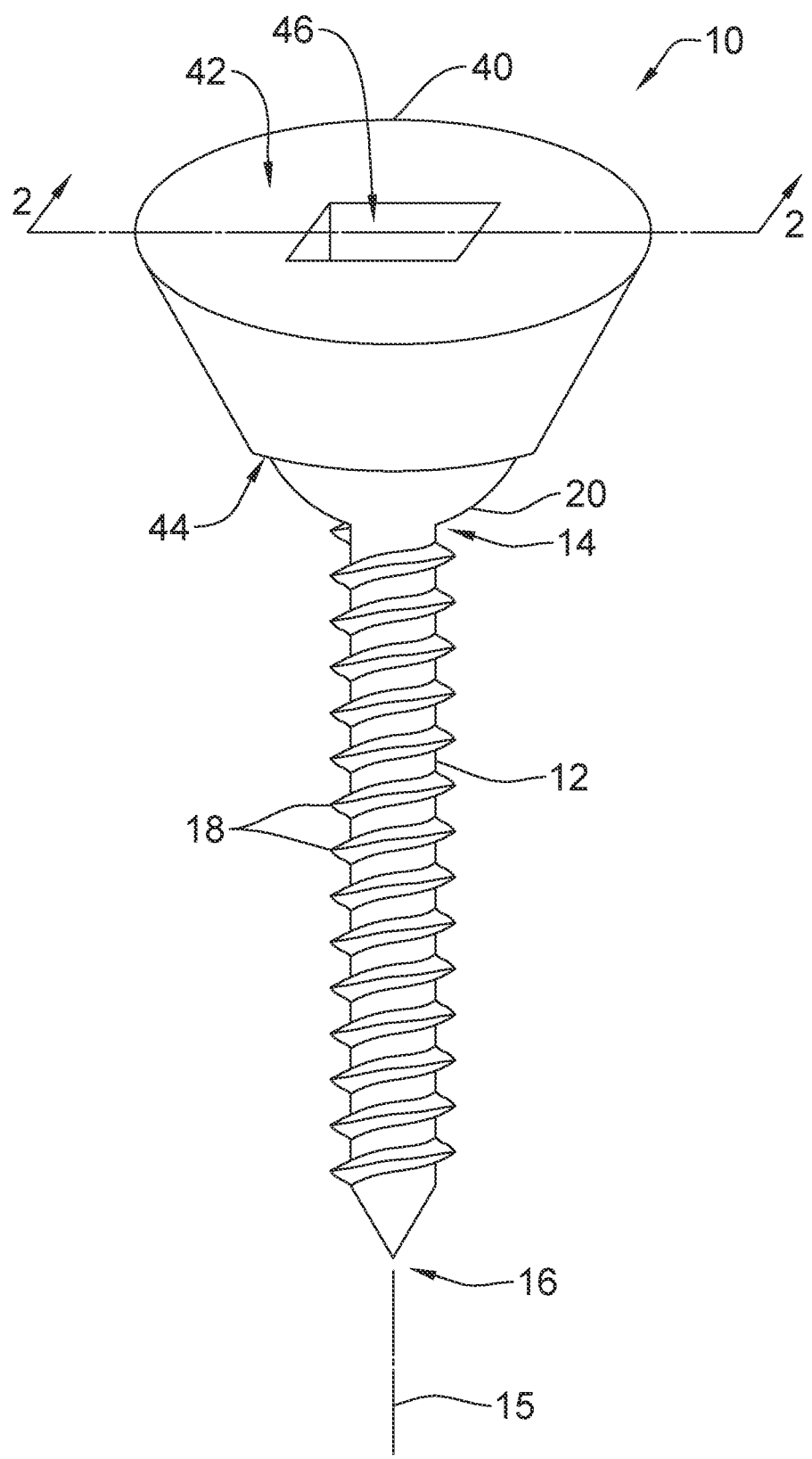
FIG. 1 is a perspective view of a fastener having a rotatable head according to a first embodiment of the present invention.

Referring to FIG. 1, an apparatus for fastening objects together according to a first embodiment of the invention is shown generally at 10. The apparatus may be commonly referred to as a fastener or screw as are commonly known in the art. The fastener 10 comprises a shank portion 12 and a head portion 40 pivotable with respect to the shank portion. In operation, a screw driver (not shown) or the like may be utilized to rotate the head portion 40 which in turn rotates the shank 12 thereby driving the shank 12 into a body through operation of threading 18 therearound as will be more fully described below. During such operation, the head 40 may be pivoted independently of the shank 12 so as to realign the screw driver to a more desirable angle without adversely affecting the angle of the shank portion 12.

The shank portion 12 comprises an elongate member extending between top and bottom ends, 14 and 16, respectively along a longitudinal axis 15. As illustrated in FIG. 1, the bottom end 16 of the shank 12 may include a pointed tip as are commonly known. The top end 14 includes a semi-spherical body 20 thereon for integration with the head portion 40 as will be more fully described below.

Figure 2:
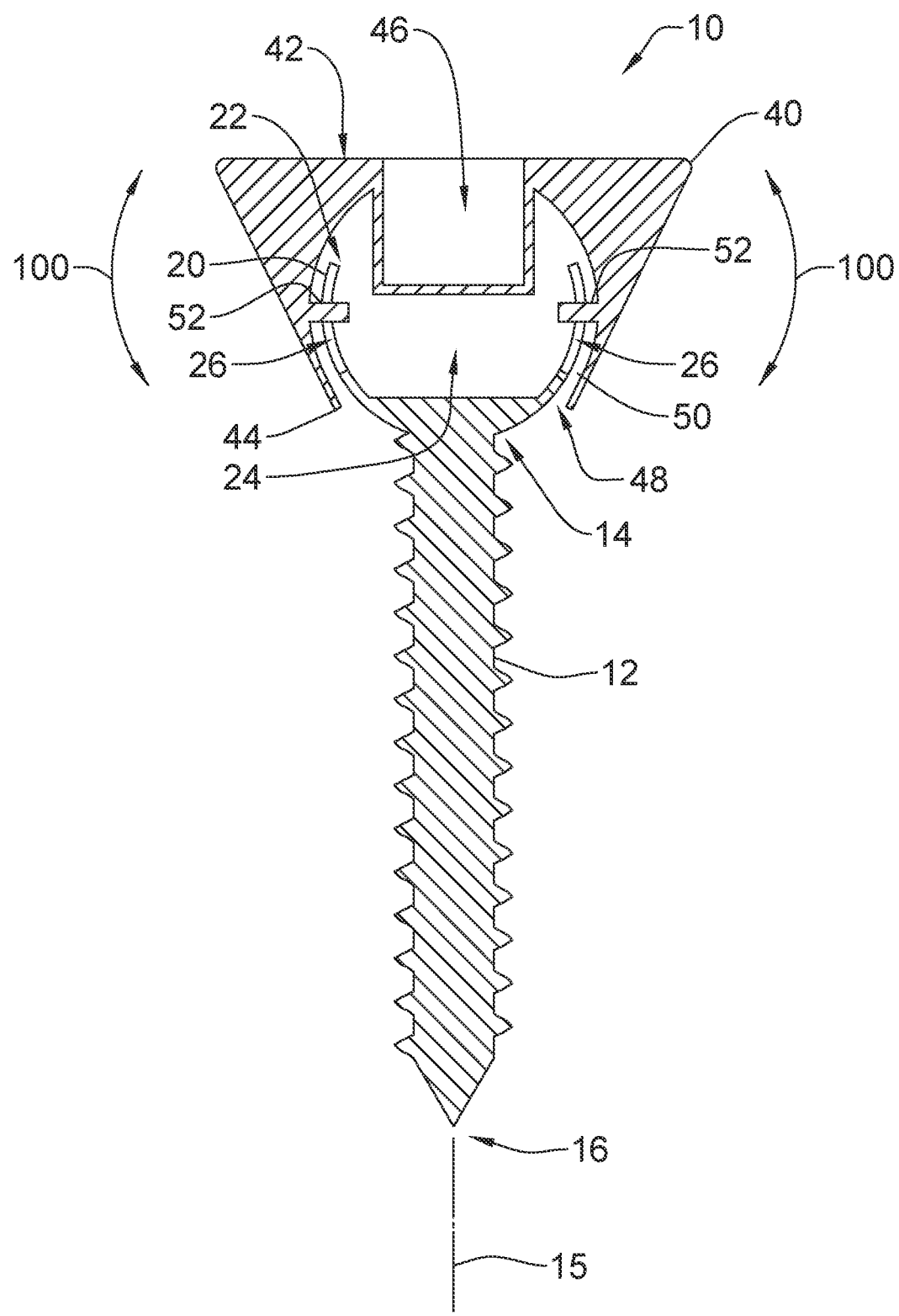
FIG. 2 is a cross sectional view of the fastener or FIG. 1 as taken along the line 2-2.
Figure 3:
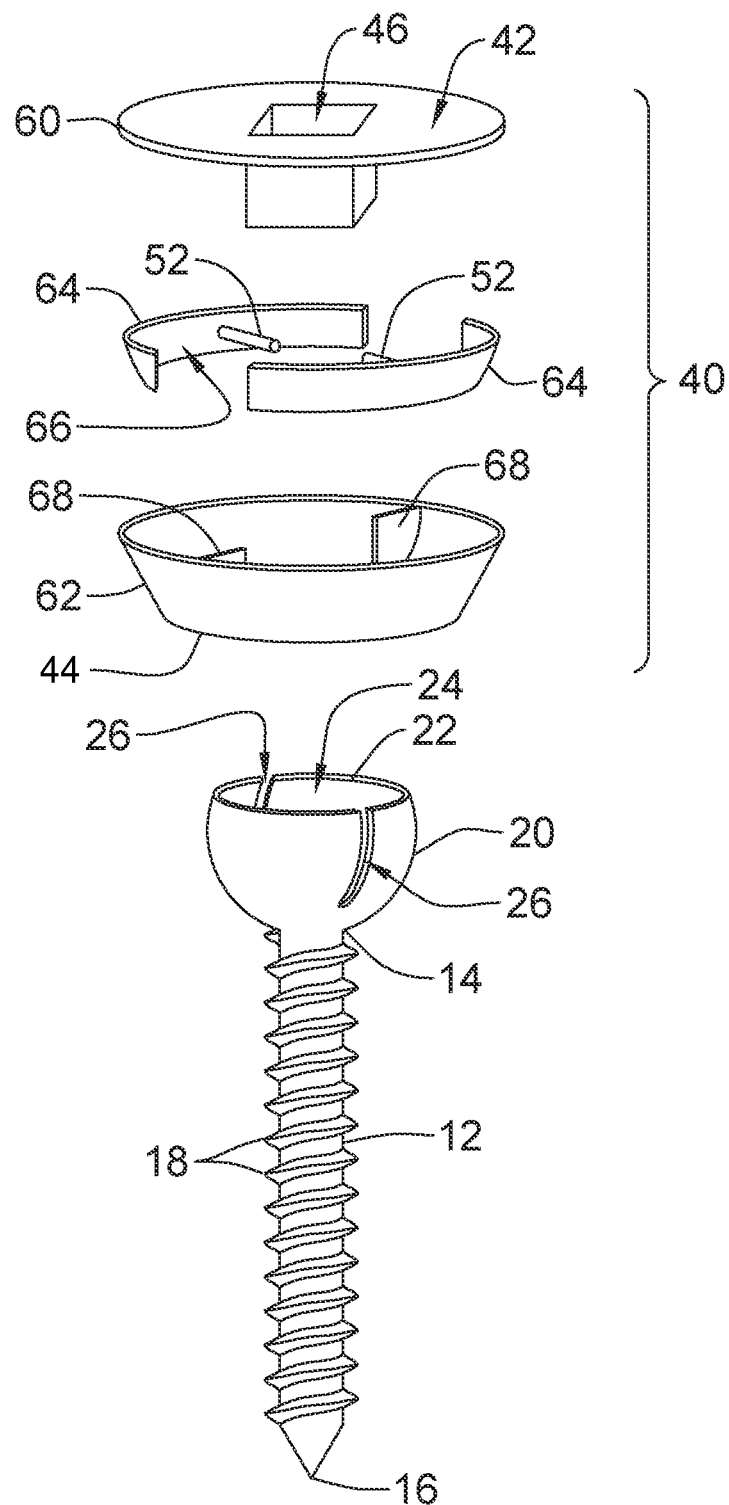
FIG. 3 is an exploded view of a fastener having a rotatable head according to a further embodiment of the present invention.

With reference to FIGS. 2 and 3, the semi-spherical body 20 includes a spherical body having an open top 22 and a substantially hollow interior 24. The semi-spherical body 20 includes slots 26 extending therethrough along paths parallel to the axis 15 of the shank 12.

Figure 5:
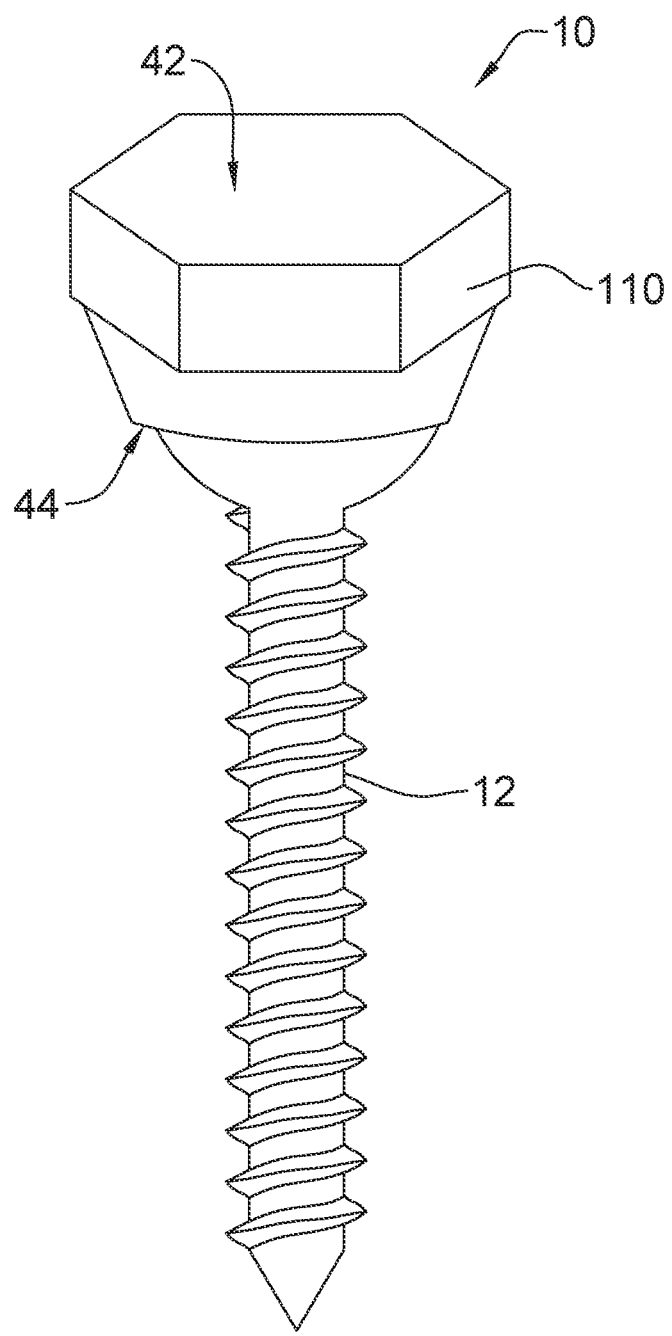
FIG. 5 is a cross sectional view of a fastener having a rotatable head according to a further embodiment of the present invention.

The head portion 40 comprises a body extending between a top surface 42 and a bottom edge 44. The top surface 42 may be substantially planar as illustrated or may optionally have any surface profile as desired by a user. The top surface includes a drive socket 46 located therein sized and shaped to receive a head of a screw driver as are commonly known. In particular, as illustrated in the Figures, the drive socket 46 is illustrated as a Robertson head although a Philips, Hex, Torx, slot or any other know screwdriver type. As further illustrated in FIG. 5, the head potion 40 may include an exterior drive engagement means such as a bolt head 110.

As illustrated in FIG. 2, the bottom edge 44 of the head portion 40 defines an opening 48 into a receptacle 50 formed within the head portion. The receptacle 50 has a circular profile sized and shaped to receive and retain the semi-spherical body 20 therein. In particular, as illustrated in FIG. 2, the opening 48 will have a diameter less than the outer diameter of the semi-spherical body 20 so as to retain the semi-spherical body therein. The receptacle 50 includes at least one pin 52 extending radially therefrom and having a length sufficient to pass through the slots 26 in the semi-spherical body 20. The pins 52 prevent rotation of the head portion 40 relative to the shank 12 about the axis 15 of the shank while permitting the head portion pivot relative to the shank in the direction generally indicated at 100 so as so enable the screw driver to have a different angle from the shank. It will be appreciated that such pivoting will be permitted by moving the pins 52 up and down within the slots 26 about their common center of rotation. As illustrated in FIG. 2, the drive socket 46 is located so as to extend through the opening 22 of the semi-spherical body 20 and into the hollow interior 24 thereof. Accordingly, any rotation of the head relative to the shank portion 12 will also maintaining the top of a screwdriver located therein at a constant position so as to reduce slipping of the screwdriver head out of the drive socket and provide a more compact structure. Additionally, it will be appreciated that were the shank portion 12 is driven into the surface at an angle, the head portion 40 may be permitted to rotate to sit flush with the surface of the material. Such rotation will be particularly useful for use with hinge brackets or the like to ensure that the head portion 40 sits flush with the bracket.

With reference to FIG. 3 according to a further embodiment, the head portion 40 may be substantially hollow and formed by a top plate 60 and a bottom conical plate 62. The top and bottom plates 60 and 62 may be connected together through any commonly known means, such as, by way of non-limiting example, fasteners, adhesives, welding or the like. In such embodiments, the receptacle may be formed by at least one socket plate 64 having a semi-spherical inner surface 66 as set out above corresponding to the semi-spherical body 20. The pins 52 may extend from such inner surfaces 66. The bottom or top plate 60 or 62 may further include locating plates 68 extending therefrom at locations corresponding to the edges of the socket plates 64. When assembled, the socket plates 64 extend to the edges of the locating plates and are therefore prevented from rotating about the axis 15 of the shank 12 by the locating plates 68.

Although by the above description, pins are described as extending inwardly through the semi-spherical body on the shank, it will be appreciated that the slots may be located in the receptacle surrounding the semi-spherical body wherein such pins then extend from the semi-spherical body to pass therethrough. Additionally, other means of rotationally fixing one body to another while permitting other pivoting movements may also be utilized, such as, by way of non-limiting example, splines between the semi-spherical body and the receptacle. It will also be appreciated that although two pins are illustrated as extending from each side of the receptacle a single pin may extend continuously between across the full distance or one pin may also be utilized.

Figure 4:
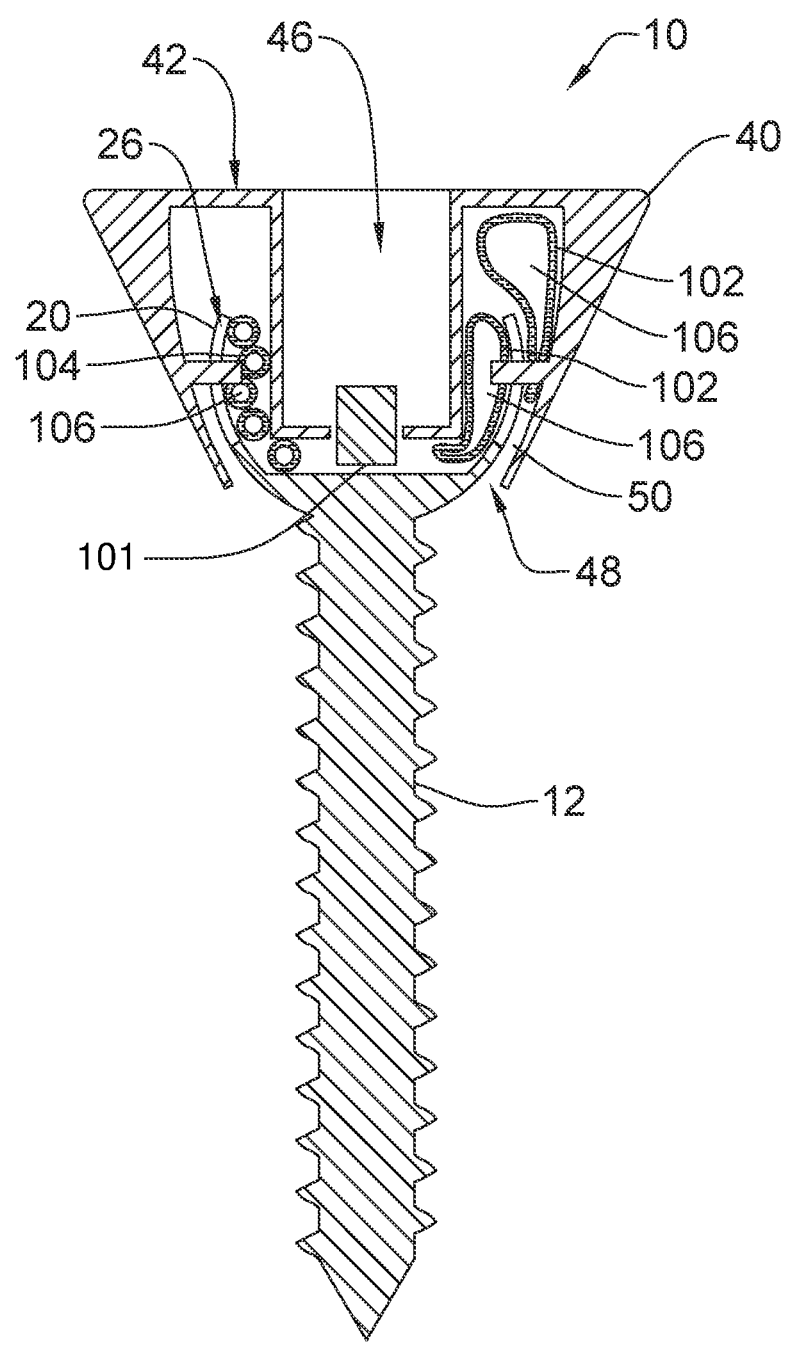
FIG. 4 is a cross sectional view of a fastener having a rotatable head according to a further embodiment of the present invention.

Turning now to FIG. 4, the fastener 10 may include a means for locking the pivot of the head portion 40 relative to the semi spherical body 20 so as to permit fixing once installed. Such means may include a set screw 101 extending through the bottom of the drive socket 46 so as to be engagable on the inside surface of the semi spherical body or a plurality of selectably rupturable bodies containing an epoxy or other curable adhesive. In particular, cavity between either the drive socket 46 and the semi spherical body 20 may contain such bodies or they may be located between the semi spherical body 20 and the receptacle 50. As illustrated in FIG. 4, the adhesive containers may comprise a portion of the adhesive 106 contained within a plurality of capsules 104 or within a bladder 102. The wall of such container 102 or 104 may be either frangible so as to be ruptured when the head 40 pivots relative to the shank 12 or dissolvable so as to be dissolved and released into the desired cavity when located within a liquid such as under water or the human body.

While specific embodiments of the invention have been described and illustrated, such embodiments should be considered illustrative of the invention only and not as limiting the invention as construed in accordance with the accompanying claims.

What is claimed is:

1. A fastener comprising:
   a threaded shank extending along an axis between top and bottom ends;
   a substantially hollow semi spherical body affixed at said top end of said threaded shank; and
   a head having a receptacle adapted to closely surround said semi-spherical body, said head being pivotable about said semi spherical body and rotatably fixed relative to said semi spherical body about said axis of said threaded shank;
   and a drive socket disposed nested within said semi spherical body of said head adapted to receive a tool for rotating said head and said threaded shank about said axis of said threaded shank.

2. The fastener of claim 1 wherein said semi-spherical body includes longitudinal slots extending therealong parallel to said axis of said threaded shank.

3. The fastener of claim 2 wherein said receptacle includes pins extending radially inwardly therefrom at positions corresponding to said longitudinal slots of said semi-spherical body.

4. The fastener of claim 1 wherein said head has a substantially hollow interior therein.

5. The fastener of claim 4 wherein said receptacle is formed by at least two semi-spherical plates rotationally fixed within said head.

6. The fastener of claim 5 wherein said head includes plates extending radially into said hollow interior thereof between said semi-spherical plates so as to rotationally fix said semi-spherical plates therein.

7. The fastener of claim 1 further comprising a set screw extending from said receptacle so as to be adapted to be extended into engagement with said semi-spherical body so as to pivotally lock said head to said semi spherical body.

8. The fastener of claim 7 wherein said set screw extends to said drive socket.

9. The fastener of claim 1 further comprising a portion of a selectably hardenable epoxy between said receptacle and said semi spherical body.

10. The fastener of claim 9 wherein said portion of selectably hardenable epoxy is contained within at least one containment body.

11. The fastener of claim 10 wherein said at least one containment body is frangible.

12. The fastener of claim 10 wherein said at least one containment body is dissolvable.

\* \* \* \* \*